May 13, 1930.  R. M. G. PHILLIPS  1,758,619
TIMER FOR AUTOMATICALLY CONTROLLING ELECTRIC STOVES
Filed Feb. 5, 1925  7 Sheets-Sheet 2

Ross M. G. Phillips
INVENTOR

BY
Perlie P. Fallon ATTORNEY

May 13, 1930.  R. M. G. PHILLIPS  1,758,619
TIMER FOR AUTOMATICALLY CONTROLLING ELECTRIC STOVES
Filed Feb. 5, 1925   7 Sheets-Sheet 3

Ross M. G. Phillips
INVENTOR

BY
Leslie P. Fallon ATTORNEY

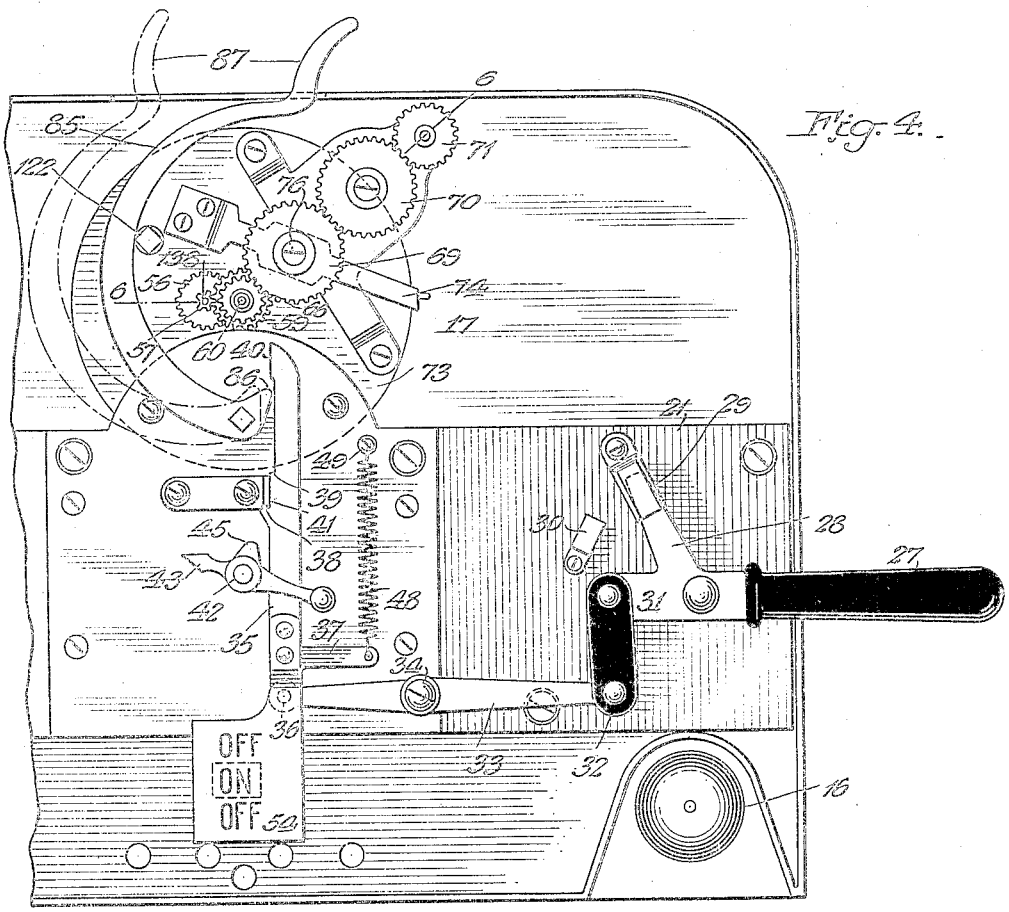
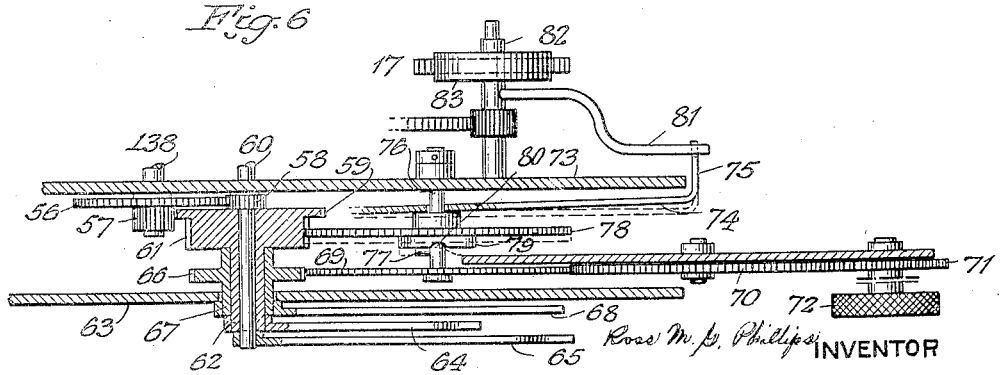

May 13, 1930.   R. M. G. PHILLIPS   1,758,619
TIMER FOR AUTOMATICALLY CONTROLLING ELECTRIC STOVES
Filed Feb. 5, 1925   7 Sheets-Sheet 5

Ross M. G. Phillips INVENTOR

BY

Perlie P. Fallon ATTORNEY

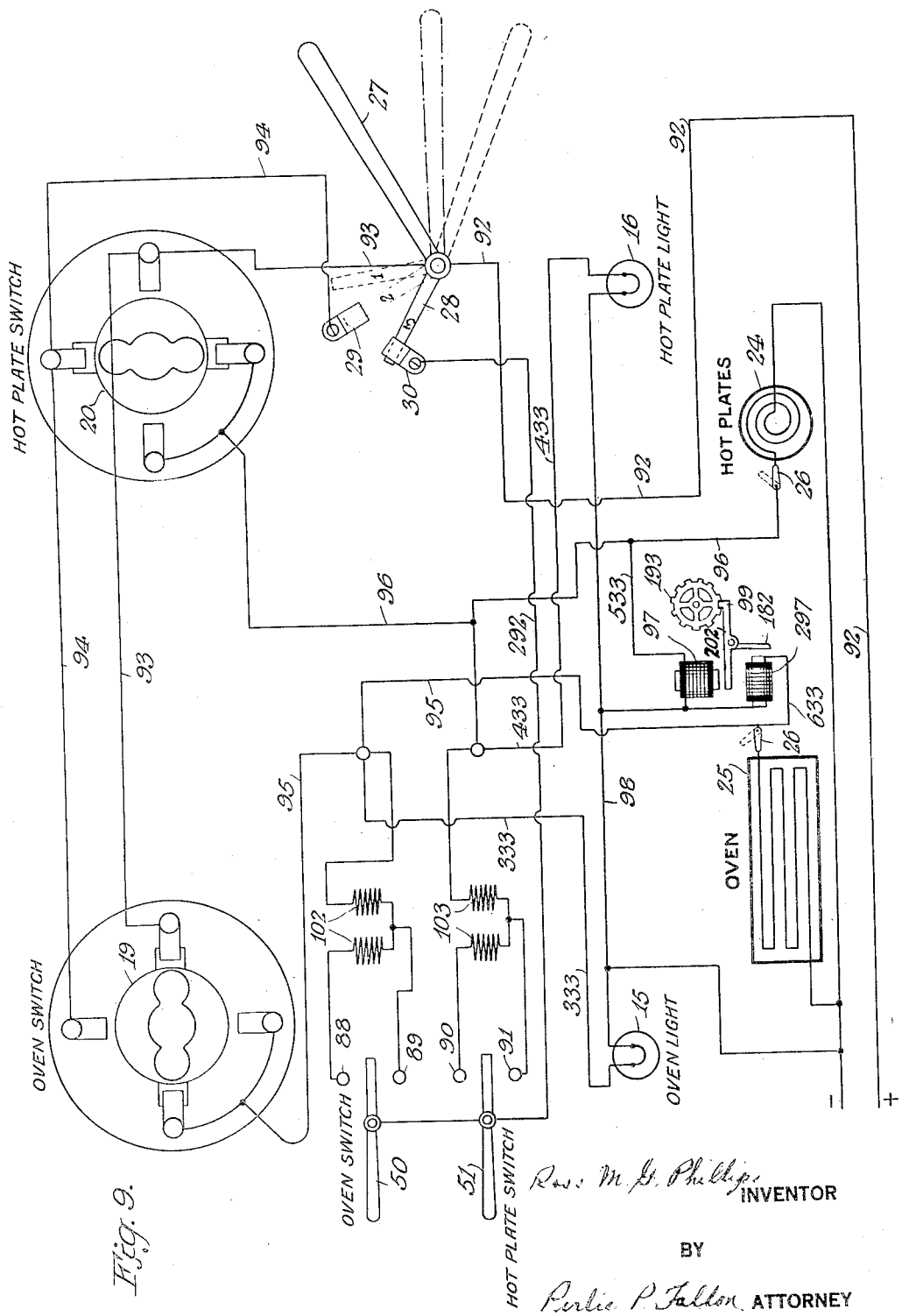

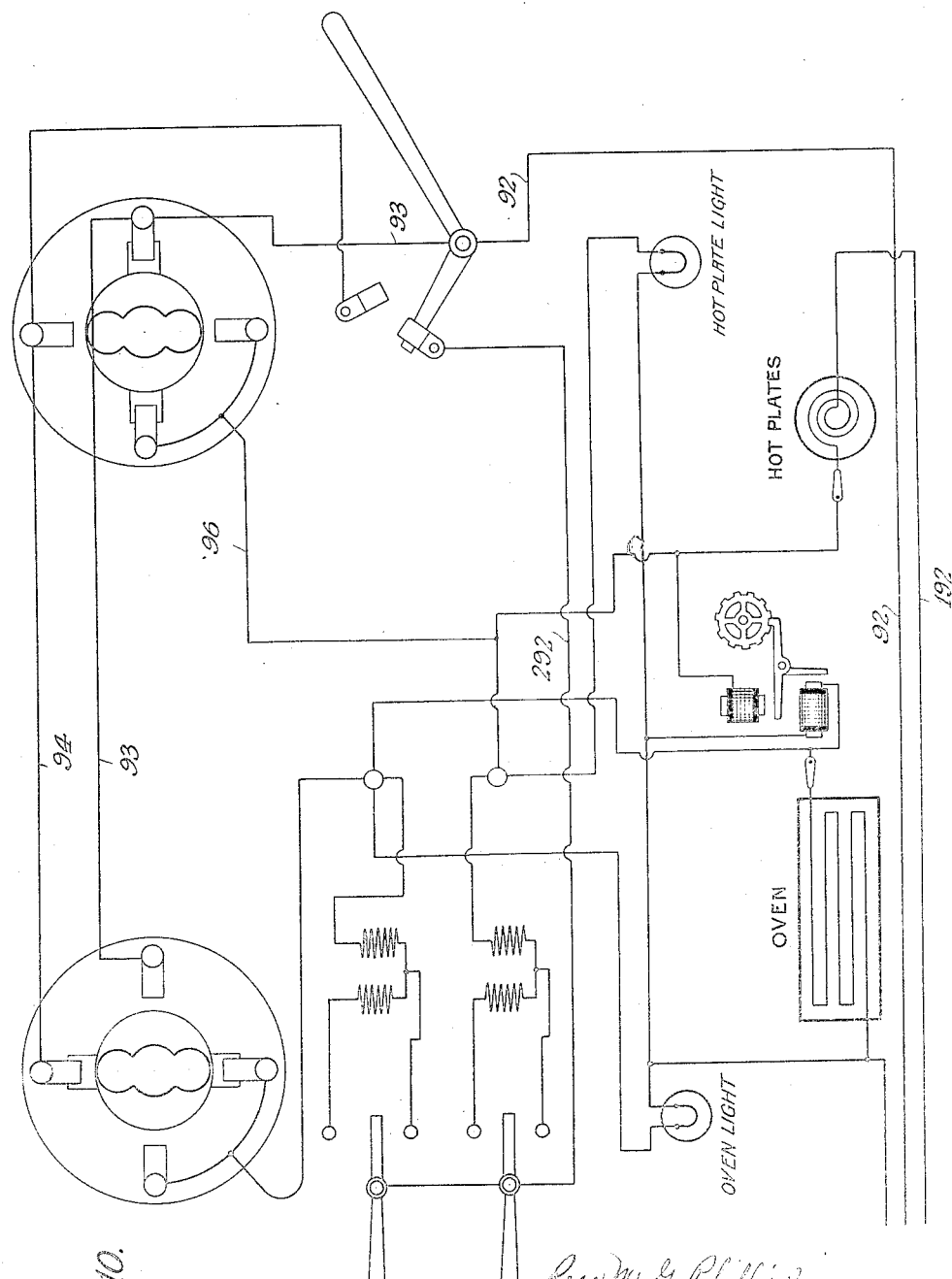

Patented May 13, 1930

1,758,619

UNITED STATES PATENT OFFICE

ROSS M. G. PHILLIPS, OF NEW HAVEN, CONNECTICUT, ASSIGNOR, BY MESNE ASSIGNMENTS, TO STANDARD GAS EQUIPMENT CORPORATION, OF MARYLAND

TIMER FOR AUTOMATICALLY CONTROLLING ELECTRIC STOVES

Application filed February 5, 1925. Serial No. 7,051.

My invention relates to timers for automatically controlling electric stoves and has for its object to control automatically the heating elements of such stoves at predetermined times without personal attention.

A further object of my invention is to provide an automatic control for such stoves which is adapted to turn the heat on and off or either at predetermined times.

A further object of my invention is to provide an automatic control for such stoves which is adapted to furnish a desired heat for a predetermined time and then automatically furnish a lower degree of heat.

A further object of my invention is to provide an automatic control for such stoves which is adapted to furnish separate control for different heating elements such, for example, as an oven and a hot plate.

Other and further objects of my invention will be apparent from the following description of illustrative embodiments thereof and from the accompanying drawings in which,—

Figure 1:
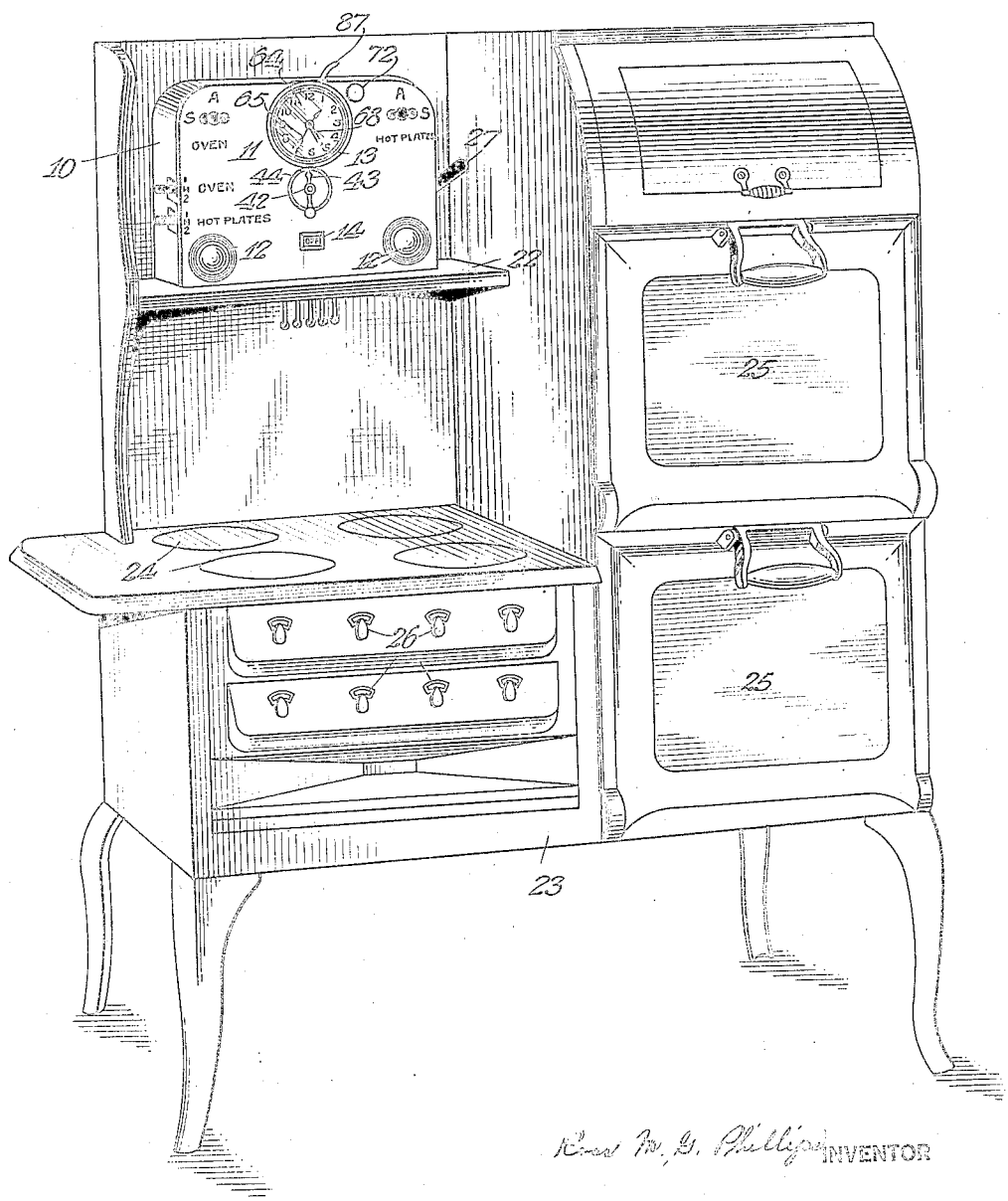
Figure 2:
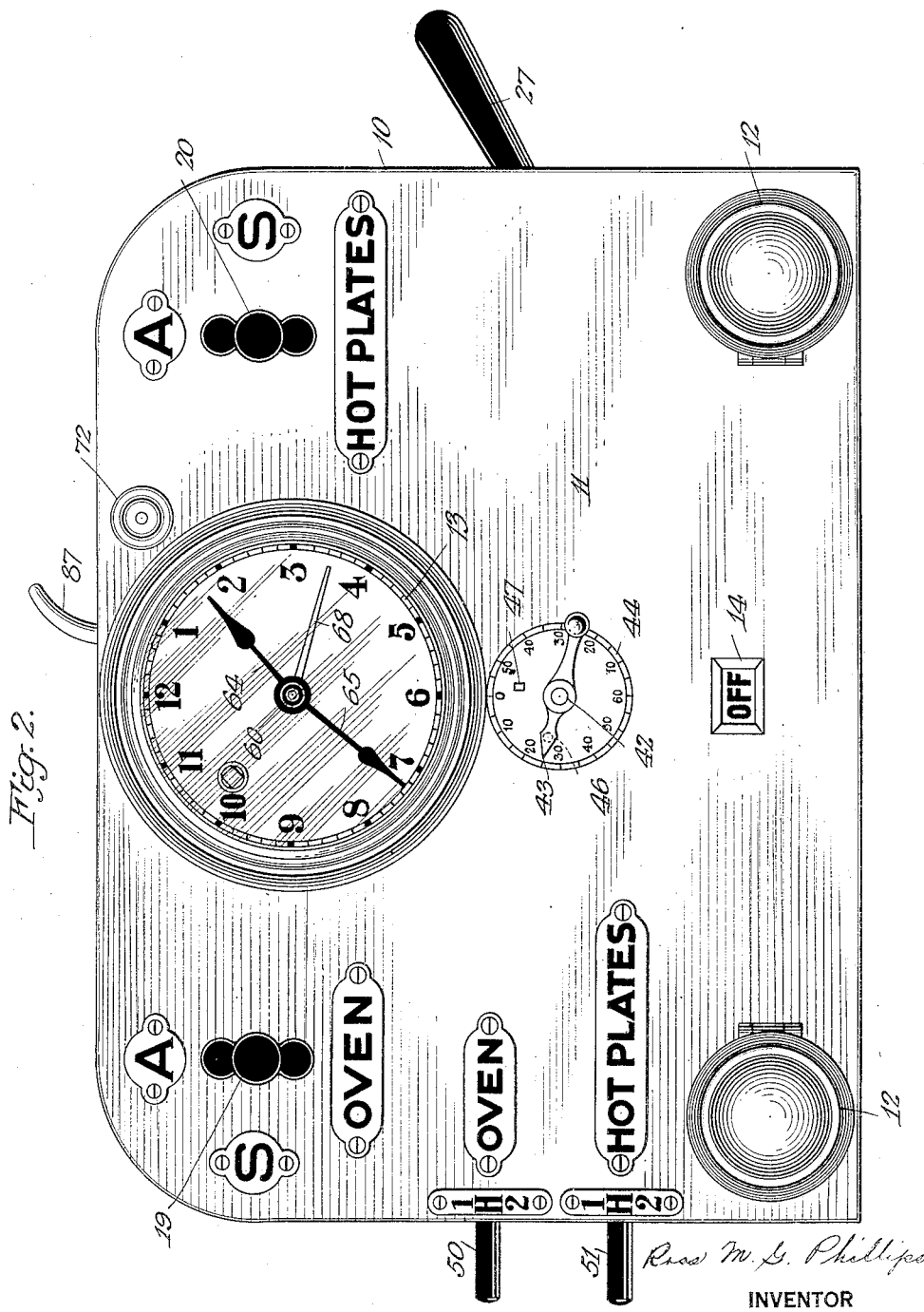
Figure 3:
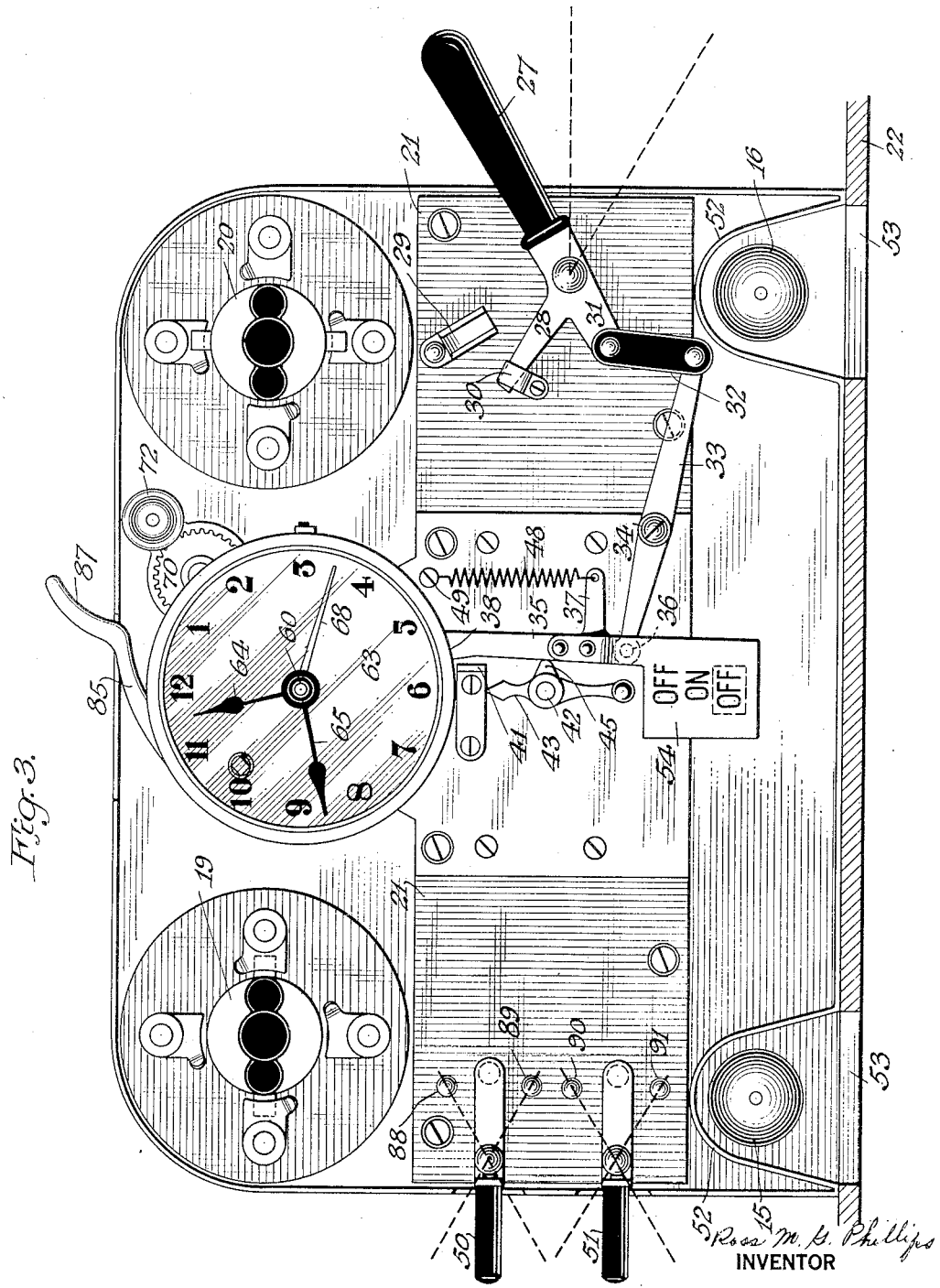
Figure 5:
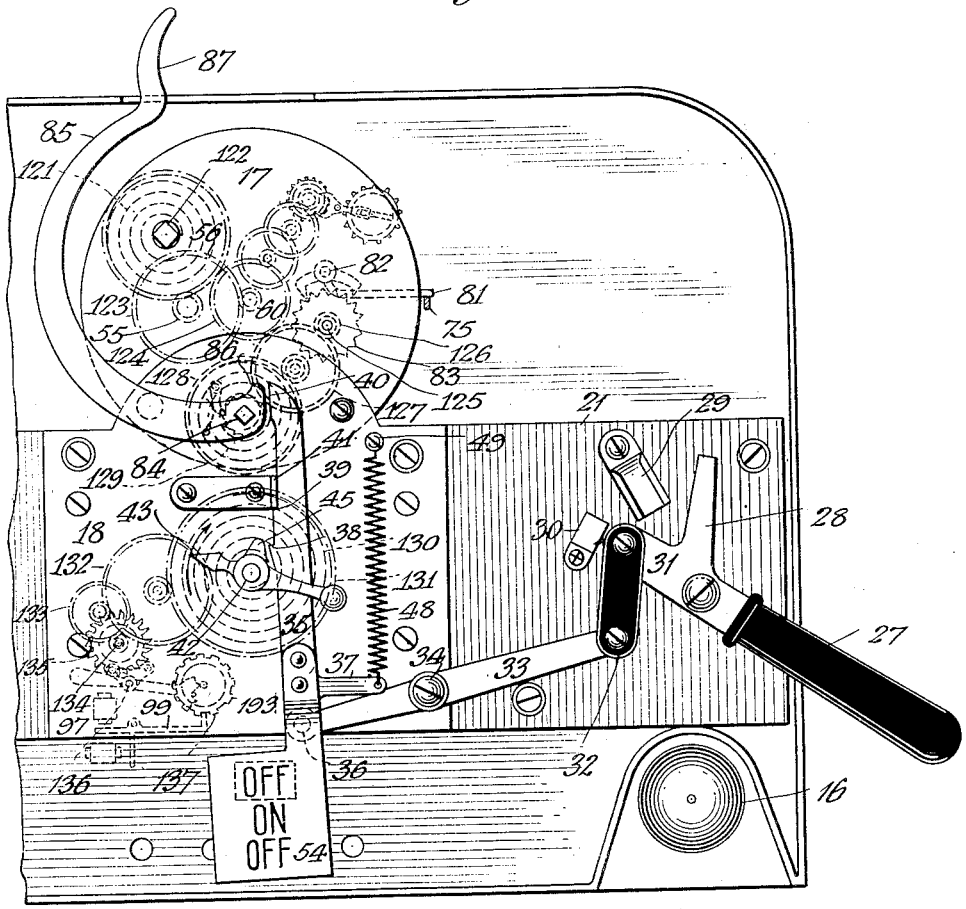
Figures 7, 8:
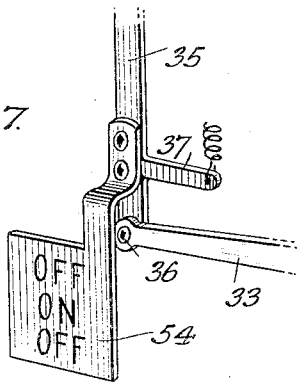

Figure 1 is a perspective of a conventional electric stove showing an embodiment of my invention applied thereto;

Figure 2 an enlarged front elevation of the timer illustrated in Figure 1;

Figure 3 a view similar to Figure 2 with the front cover removed;

Figure 4 a fragmentary view similar to Figure 3 with further parts removed;

Figure 5 a view similar to Figure 4 with still further parts removed;

Figure 6 a section on line 6—6 of Figure 4 with parts shown in full plan view;

Figure 7 a perspective of a detail of a tripping mechanism;

Figure 8 a side view of an indicator;

Figure 9 a diagram of one embodiment of an electric wiring layout adapted to be connected to a two-wire source of electrical supply; and Figure 10 a diagram of one embodiment of an electric wiring layout adapted to be connected to a three-wire source of electrical supply.

Similar reference characters refer to similar parts throughout the drawings.

Although the timer may be placed in any desired position on the stove, it is shown in the embodiments illustrated on a shelf 22 (Fig. 1) of the range 23 provided with the usual hot plates 24 and ovens 25 which are wired to the timer through the usual switches 26.

The timing mechanism preferably is enclosed in a suitable casing 10 (Fig. 1) of any desired material, provided with a cover 11 having lamp openings 12, a clock opening 13, and a sight opening 14. Within casing 10 is an electric lamp 15, (Figs. 3 and 9) connected to the oven circuit, an electric lamp 16 connected to the hot plate circuit, an automatic starting mechanism 17, (Fig. 5) an automatic stopping mechanism 18, (Figs. 4 and 5) a snap switch 19, (Figs. 2 and 9) connected to the oven circuit, a snap switch 20 connected to the hot plate circuit, and an insulating slab 21 (Fig. 3) carrying the heat controlling switches, time control mechanism and tripping elements described hereinafter.

A make and break switch 27, (Fig. 3) pivoted to the slab 21, is shown as provided with an arm 28 adapted to engage a terminal contact 29 and a terminal contact 30 against which latter contact it normally rests for manual control. This switch 27 may be placed in any one of the three positions shown in Fig. 9. Said switch 27 (Fig. 4) also is provided with an arm 31 connected by an insulating link 32 to a lever 33 pivoted at 34 to slab 21, the other end of which lever is pivoted or otherwise connected to a vertically arranged bar 35 as at point 36, said bar having a lateral arm 37, shoulders 38 and 39 (Fig. 5) and a tripping surface 40 (Fig. 5). A stop 41 adjacent bar 35 is adapted to engage shoulders 38 and 39 of said bar in the different operations of the timer. Arm 37 of said bar is connected to a tension spring 48, the other end of which spring is secured to a stud or screw 49, the spring tending to raise bar 35 and to force it to the left (Fig. 4).

At the left of slab 21 (Figs. 3 and 9) is provided a switch 50 in the oven circuit and a switch 51 in the hot plate circuit. Switch 50 is adapted to contact selectively with terminal contacts 88 and 89, connected respectively with all or only part of a resistance 102, and switch 51 is adapted to contact selectively with terminal contacts 90 and 91 connected respectively with all or only part of a resistance 103.

Lamps 15 and 16 (Fig. 3) are provided with reflectors 52 to project the light downwardly through openings 53 provided in shelf 22. As these lamps are connected by the wires 333 and 433 respectively to the oven circuit and to the hot plate circuit, they serve to indicate whether the heating element is operating and to some degree the amount of heat supplied.

As a further source of heat indication, vertical bar 35 is provided with a plate 54 (Fig. 3) bearing the legends "Off" "On", "Off", one of which always can be seen through sight openings 14 (Fig. 2) in cover 11 and which indicates the position of bar 35 and thus of switch 27.

The automatic starting mechanism 17 (Figs. 4, 5 and 6) which is adapted to start either or both of the heating elements at any predetermined time, consists in the present embodiment of any desired clock or time measuring mechanism operated by the spring 121 wound by the arbor 122 and operating wheel 123 on shaft 55, which meshes with shaft 60 driving wheel 124, which is connected with the ordinary clock mechanism shown in the upper left hand part of Fig. 5. The hour hand is controlled by gears 58, 56, 57 and 59 which mesh respectively. Gear 58 is fixed on shaft 60 to which also is fixed minute hand 65, and gear 59 is mounted rotatively on said shaft 60 and is provided with an enlarged sleeve 62 on which is fixed the hour hand 64. On said sleeve 62 is mounted rotatively a sleeve 67 carrying a set hand 68 and having a gear 66 meshing with a gear 69 which in turn meshes with gear 70 engaged by a gear 71 provided with a knob or handle 72 projecting outwardly through cover 11 (Fig. 2).

A rotatable shaft 76 carrying a pin 77 and the gear 69 has rotatably mounted thereon a gear 78 which meshes with a gear 61 integral or fixed to gear 59, and which is provided with a timing cam 79 having a notch 80 adapted to receive the pin 77 when the two are in alignment. When notch 80 of timing cam 79 is not in alignment with pin 77, the back of said timing cam 79 maintains a spring arm 74 (mounted in any desired manner) in such position that a right angled extension 75 thereon normally projects under arm 81 secured to an escapement shaft 82 which controls, through the escapement lever mounted thereon, the movement of escapement wheel 83 mounted on arbor 125 (Fig. 5) and by means of pinion 126 wheel 127 and wheel 128 controls the movement of arbor 84 under tension of spring 129. When escapement wheel 83 is released, spring 129 unwinds and rotates arbor 84 by action similar to the alarm movement of a clock. Arbor 84 carries a set arm 85 with a tripping nose 86 and an upwardly extending finger piece 87 projecting through the top of casing 10. When escapement lever 81 is held by extension 75 of spring arm 74, it prevents rotation of escapement wheel 83. When escapement lever 82 is released by the disengagement of the extension 75 from the arm 81, escapement wheel 83 being released, spring 129 will rotate arbor 84, and tripping nose 86 on tripping arm 85 will trip bar 35, which latter will be pulled upwardly by its spring 48 and will rock switch 27 and engage the same with contact 29, thereby initiating the heating action.

The automatic stopping mechanism 18 (Fig. 5) which is adapted to move switch 27 to stop or diminish the heat at any predetermined time consists, in the present embodiment, of a shaft or arbor 42, carrying a pointer 43 ranging over a graduated dial 44 (Fig. 2) on cover 11. Shaft 42 (Fig. 5) also carries a trip lug 45 adapted to force bar 35 to the right and throw shoulder 38 thereon out of engagement with stop 41 when the predetermined time arrives for terminating or diminishing the desired heating. Pointer 43 is provided with a pin 46 (Fig. 8) adapted to engage a stop 47 (Fig. 2) at its zero point.

Operating spring 130 (Fig. 5) is mounted on and moves arbor 42 on which is also mounted wheel 131 meshes with wheel 132 which meshes with wheel 133, which meshes with arbor 134 of escapement wheel 135, which in turn operates balance wheel 137 by lever 136. Balance wheel 137 is normally held in position by trip 99 connected to armatures 202 and 182 (Fig. 9) of electromagnets 97 and 297. Electromagnet 97 is connected to the hot plate circuit by wire 533 and electromagnet 297 is connected to the oven circuit by wire 633. When automatic starting mechanism 17 throws switch 27 into connection with contact 29 from the position of said switch shown in Fig. 5, as described above, the electromagnets 97 and 297 are energized according as the oven or hot plate circuits are connected through the switches 19 and 20 the trip 99 is withdrawn and spring 130 is released and turns arbor 42 until trip 45 comes into contact with bar 35 and throws shoulder 38 out of connection with stop 41 whereby bar 35 is released and switch 27 is connected with contact 30.

An advantage of this part of my invention is that if the supply of current from the source is cut off or interfered with the automatic stopping mechanism ceases to operate until the supply of current is resumed, and thus the cooking goes for exactly the predetermined time set on dial 44.

The diagrammatic wiring illustrated in Figure 9 of the drawings is shown as consisting of a main feed wire 92, a straight circuit feed wire 93, an automatic circuit feed wire 94, an oven circuit feed wire 95, and a hot plate circuit feed wire 96. The lights 15 and 16 are connected by the wires 333 and 433 and the electric magnets 97 and 297 are connected as described above.

The diagrammatic wiring illustrated in Figure 10 of the drawings is similar to that in Figure 9 with the exception of a third wire 192 which is shown as leading from the hot plate elements in order to facilitate connecting the timer to a three-wire source of electrical supply.

As the oven and the hot plate circuits are identical, in arrangement and operation, a description of either will suffice for the other.

When is is desired to use the stove for heating my manual control as distinguished from automatic control (straight feed heating), switch 27 is placed in position 3 as shown in Figure 9 and switch 19 or switch 20 or both, according to whether either the oven or the hot plate or both is desired to be used, is turned to position as shown by switch 19 of Figure 9. When the oven only is used (the arrangement illustrated in Fig. 9) the circuit will be closed through wires 92, 93, switch 19, and wire 95 to oven 25. The hot plate will not be heated as switch 20 is in position for automatic feed as distinguished from straight feed. When it is desired to use the stove for heating under automatic control, the oven heat may be regulated by operating switch 50 to cause part of the current to be diverted through part or all of resistance 102, depending upon the position of switch 50. The oven heat may, with the switch 27 set in this position, and the switch 19 set for automatic control, be controlled by the operation of the switch 50 to bring into the heating circuit, all or part of the resistance 102, depending upon setting of switch 50. If switch 50 is connected with terminal 88, for instance, the heating current will pass by conductor 92 to switch 27, thence by conductor 292 to switch 50, thence to contact 88, and flowing through the whole of resistance 102, will pass to the oven by conductor 95 and thence to the negative lead-in, thereby giving a low degree of heat. If, on the other hand, switch 50 is connected with terminal 89, then only a half of resistance 102 will be included in the heating circuit, thereby obtaining an intermediate degree of heat. The number of resistances shown is illustrative merely of any desired number and arrangement of resistances. The amount of heat in any particular heating unit will, of course, depend on the number of units being used.

When it is desired to use the stove for heating by automatic control, switch 27 is placed in position 1 (Fig. 9) and the switches 19 and 20 turned to automatic feed position (or either of them as may be desired) as shown by switch 20 in Figure 9 of the drawings.

If it is desired to start the heating operation at some future predetermined time, the set hand 68 (Figs. 2 and 6) is turned to that time by the knob 72, thus moving pin 77 to a corresponding position, the handle 87 is pushed to the left as shown in dotted lines in Figure 4, and the switch 27 is placed in position 1 (Fig. 9), and switches 19 or 20, or both, are moved to automatic position. When the desired time arrives, notch 80 on timing cam 79 (Fig. 6) will have arrived in alignment with pin 77, thereby permitting spring arm 74, and its right angle extension to release arm 81, thereby freeing gear 83 (Fig. 5) from the escapement lever of escapement shaft 82 and permitting the turning of shaft 84 to move tripping nose 86 to push bar 35 to the right so that its notch 39 (Fig. 5) will pass stop 41. Bar 35 will rise under the influence of its spring 48 until its notch 38 is engaged by stop 41, thus moving switch 27 to position 2 (Fig. 9) which closes the circuit in the automatic feed and thus starts the heat in the oven or in the hot plate or both according to whether one or both of switches 19 and 20 have been turned to automatic position.

If it is desired to stop the heating after a predetermined time, pointer 43 is turned counter-clockwise the desired number of minutes (Figs. 2 and 5) thus moving its trip lug to a corresponding position. When the heat is turned on, magnet 97 is energized moving armature 202 thus to permit automatic stopping mechanism 18 to begin to turn, (if the oven circuit is used magnet 297 will be energized moving armature 182.) When lug 45 reaches bar 35 (Fig. 4) it will push the bar to the right until its notch 38 is disengaged from stop 41 thus permitting bar 35 to rise which throws switch 27 from position 2 (Fig. 9) to position 3 (Fig. 9), thus opening the automatic feed circuit and stopping the heating. If, however, the switch 50 or 51 or both have been placed in contact, diminished heating will be initiated or continued by a circuit through wire 292.

If, for example, it was desired to use the hot plate at a future time, as five o'clock, for maximum heat for sixty minutes and then for a simmering or merely heat maintaining temperature, the hot plate switch 20 would be turned to automatic position as shown in Figure 9, handle 87 would be pushed to the left, switch 27 pushed down to position 1 (Fig. 9), set hand 68 (Fig. 2) set at five o'clock, pointer 43 (Fig. 2) turned counter-clockwise to 60, and switch 51 turned to contact 90. Until five o'clock no heat would reach the hot plate. At five o'clock switch 27 would be forced to position 2 (Fig. 9), thus starting the heating of hot plates 24 by a circuit closed through wire 92, switch 27, contact 29, wire 94, switch 20, wire 96, to hot plates 24 and return, and stopping mechanism 18 would be set in operation. When sixty minutes had elapsed switch 27 would be thrown to position 3 (Fig. 9) thus opening the circuit through wire 94 and closing the circuit through wire 92, switch 28, contact 30 wire 292, switch 51, contact 90, resistance 103, wire 96, to hot plates 24 and return. The same operation may be obtained in the oven by a corresponding change in the switches. Both the oven and the hot plates can be set in operation at a desired future time and the heat diminished in one or both or any desired combination of heating obtained within the limits of the apparatus.

Many modifications of my invention will be apparent to those skilled in the art without departing therefrom or from the scope of the claims, my invention not being limited to the embodiments chosen for purposes of illustration but consisting of a timer for electric stoves adapted to manual or automatic control, with desired heat variation.

What I claim and desire to secure by Letters Patent is:

1. In an electric stove, the combination of an electric heating element, a heating circuit therefor, a switch in said circuit, time-operated starting mechanism operative on said switch to supply electric current to the circuit at a predetermined time, and time-operated stopping mechanism operative on said switch to cut off the supply of current at a predetermined and definitely measured period of time after the starting operation and irrespective of the temperature obtained, said stopping mechanism including an electro-magnet which is independent of said starting mechanism and adapted to be energized by said current.

2. In an electric stove, the combination of an electric heating element, a main heating circuit therefor, a resistance circuit branching from said main heating circuit and having a controllable resistance, a switch included in said circuits, a timing mechanism operative on the switch to control the supply of electric current to the main heating circuit, and a second timing mechanism operative on said switch to control the supply of current to the resistance circuit.

3. In an electric stove, the combination of an electric heating element, a main heating circuit therefor, a resistance circuit branching from said heating circuit and having a controllable resistance, a switch included in said circuits, a timing mechanism operative on the switch to control the supply of electric current to the main heating circuit, and a second timing mechanism operative on said switch to control the supply of current to the resistance circuit, said second timing mechanism being controlled by the heating current.

4. In an electric stove, the combination of a heating element, a heating circuit therefor, a switch in said circuit for controlling the supply of heating current thereto, a switch actuating member movable to different positions to set said switch in different operative positions, power means for operating said member, means for releasably holding the member in its different positions from operation, timing mechanism operative at a predetermined time to release said member from one of its held positions to permit it to be moved by the power means to its other position, and a second timing mechanism operative at a predetermined time to release said member from its second held position to permit its further operation by the power means.

5. In an electric stove, the combination of a heating element, a heating circuit therefor, a switch in said circuit for controlling the supply of heating current thereto, a switch actuating member movable to different positions to set said switch in different operative positions, power means for operating said member, means for releasably holding the member in its different positions from operation, timing mechanism operative at a predetermined time to release said member from one of its held positions to permit it to be moved by the power means to its other position, and a second timing mechanism operative at a predetermined time to release said member from its second held position to permit its further operation by the power means, said second timing mechanism being controlled by the heating current.

ROSS M. G. PHILLIPS.